(12) United States Patent
Chen et al.

(10) Patent No.: US 9,765,887 B2
(45) Date of Patent: Sep. 19, 2017

(54) SEALING RING AND PREPARATION METHOD THEREOF

(75) Inventors: Xuemin Chen, Guangdong (CN); Qingdong Ye, Guangdong (CN); Jimin Yuan, Guangdong (CN); Liping Hu, Guangdong (CN); Ming Yin, Guangdong (CN)

(73) Assignee: SHENZHEN SUNXING LIGHT ALLOYS MATERIALS CO., LTD., Shenzhen, Guangdong (CN)

( * ) Notice: Subject to any disclaimer, the term of this patent is extended or adjusted under 35 U.S.C. 154(b) by 695 days.

(21) Appl. No.: 13/585,772

(22) Filed: Aug. 14, 2012

(65) Prior Publication Data

US 2012/0308430 A1   Dec. 6, 2012

(30) Foreign Application Priority Data

Jan. 18, 2012   (CN) .......................... 2012 1 0014900

(51) Int. Cl.
| | |
|---|---|
| *C22C 21/00* | (2006.01) |
| *C22F 1/04* | (2006.01) |
| *F16J 15/08* | (2006.01) |
| *C22B 34/12* | (2006.01) |

(52) U.S. Cl.
CPC ........... *F16J 15/0806* (2013.01); *C22B 34/12* (2013.01); *C22C 21/00* (2013.01); *Y02P 10/212* (2015.11)

(58) Field of Classification Search
CPC ...... F16J 15/0806; C22C 21/00; C22B 34/12; Y02W 30/54
See application file for complete search history.

*Primary Examiner* — Lois Zheng
(74) *Attorney, Agent, or Firm* — Jackson IPG PLLC; Demian K. Jackson

(57) ABSTRACT

The present invention provides a sealing ring and a preparation method thereof. The sealing ring, based on percent by weight, includes 80%-85% of aluminum, 10%-15% of titanium, 0.1%-1% of scrap iron, and 4%-4.9% of potassium fluoroaluminate. Moreover, the present invention provides a method for preparing sealing ring, which includes the following steps: Step A: melting the aluminum in a medium-frequency induction furnace, adding the potassium fluoroaluminate to the medium-frequency induction furnace after melting the aluminum, melting and stirring the mixture evenly; Step B: adding titanium scrap or sponge titanium, and scrap iron to the mixture successively, melting and mixing the mixture totally at 800° C. to 1200° C., standing the mixture after stirring evenly; Step C: removing scum on the surface; Step D: casting into a mold to obtain a final sealing ring.

3 Claims, No Drawings

SEALING RING AND PREPARATION METHOD THEREOF

TECHNICAL FIELD OF THE INVENTION

The present invention relates to a sealing ring and a preparation method thereof, and in particular to a sealing ring in equipment for preparing sponge titanium and a preparation method thereof.

BACKGROUND OF THE INVENTION

The production process of sponge titanium at home and abroad mainly adopts metallothermic reduction process, and in particular refers to preparing metal M from metal reducing agent (R) and metal oxide or chloride (MX). Titanium metallurgy method in which industrial production has been achieved is magnesiothermic reduction process (Kroll process) and sodiothermic reduction process (Hunter process). Since the Hunter process leads to higher production cost than the Kroll process does, the Kroll process is widely used in industry currently. The main processes of the Kroll process are that magnesium ingot is placed into a reactor, heated and molten after being subjected to oxide films and impurities removal, then titanium tetrachloride ($TiCl_4$) is introduced into the reactor, titanium particles generated by the reaction are deposited, and generated liquid magnesium chloride is discharged promptly through a slag hole. The reaction temperature is usually kept at 800° C. to 900° C., the reaction time is between several hours and several days. Residual metallic magnesium and magnesium chloride in end product can be removed by washing with hydrochloric acid, can also be removed by vacuum distillation at 900° C., and keep the purity of titanium high. The Kroll process has the disadvantages of high cost, long production cycle, and polluted environment, limiting further application and popularization. At present, the process has not changed fundamentally, and still belongs to intermittent production, which fails to realize continuous production.

In the equipment for producing sponge titanium, the reactor cover and the reactor need to be sealed with sealing ring, and have high performance requirements for the sealing ring. It is necessary to ensure that the sealing ring is gas-tight under production environments of high temperature and high pressure, but the selection and preparation of the sealing ring are studied less in the current production process, the pressure and temperature to which the current sealing ring is subjected are low, so that the security cannot be guaranteed during running, and the use rate and production efficiency are also influenced.

SUMMARY OF THE INVENTION

In order to solve the shortcomings of high cost, severe pollution and long production cycle in prior art, the present invention provides a sealing ring, which is the critical part of reaction equipment, characterized by easy distortion and non-cracking under a certain condition of high pressure. In the prior art, the commonly used sealing ring is made of rubber, as the shortcomings of high gas tightness and low pressure and temperature. In order to solve the technical problem, the present invention provides a sealing ring, which includes the following components based on percent by weight:
80%-85% of aluminum;
10%-15% of titanium;
0.1%-1% of scrap iron;
and 4%-4.9% of potassium fluoroaluminate.

Of these, the aluminum has a melting point of 660° C., the titanium has a melting point of 1668° C., and the iron has a melting point of 1535° C. The present invention has the above technical characteristics, advantaged in that the aluminum has excellent corrosion resistance and processability, suitable for manufacturing a double jacketed gasket; the titanium has excellent corrosion resistance and adjustable softening point under a condition of high temperature; the iron can be used for adjusting the softness and hardness of gasket; and the potassium fluoroaluminate as the component of fluxing agent can improve the binding force of sealing ring material and iron. Moreover, the aluminum, titanium and iron are selected as the main components of sealing ring just because the aluminum and titanium are ones of materials of reaction process, and the iron is consistent with the main component of reactor, which solves the problem that melting the gasket causes the pollution of reaction system.

The present invention also provides a method for preparing sealing ring material, which includes the following steps:

Step A: melting the aluminum in a medium-frequency induction furnace, adding the potassium fluoroaluminate to the medium-frequency induction furnace after melting the aluminum, melting and stirring the mixture evenly;

Step B: adding titanium scrap or sponge titanium, and scrap iron to the mixture successively, melting and mixing the mixture totally at 800° C. to 1200° C., standing the mixture after stirring evenly;

Step C: removing scum on the surface;

Step D: casting into a mould to obtain a final sealing ring.

Preferably, the melting in Step C is performed for 4 to 6 hours.

Preferably, the mould in Step D is made from high alumina cement or copper material.

The invention has the beneficial effects that the sealing ring of the invention has adjustable softening point and melting point, can be used as the sealing ring for different reactors or distillers, ensures smooth running of production process in a high pressure state, and solves the problem that the reactors and distillers are not pressure-proof and not sealable at a high temperature.

DETAILED DESCRIPTION OF THE EMBODIMENTS

The preferred embodiments of the present invention are described in detail below:

Embodiment 1

80 parts of aluminum is molten in a medium-frequency induction furnace, 4 parts of potassium fluoroaluminate is added to the medium-frequency induction furnace after melting the aluminum, mixed and stirred evenly; 15 parts of titanium and 1 part of scrap iron are added to the mixture successively, mixed and stirred evenly; the mixture is totally molten at 800° C. to 1200° C., made rest for 4 hours, then scum on the surface is removed; the obtained mixture is cast into a mould to obtain a final sealing ring.

Embodiment 2

82 parts of aluminum is molten in a medium-frequency induction furnace, 4.5 parts of potassium fluoroaluminate is added to the medium-frequency induction furnace after melting the aluminum, mixed and stirred evenly; 13 parts of titanium and 0.5 parts of scrap iron are added to the mixture successively, mixed and stirred evenly; the mixture is totally molten at 800° C. to 1200° C., made rest for 5 hours, then scum on the surface is removed; the obtained mixture is cast into a mould to obtain a final sealing ring.

Embodiment 3

85 parts of aluminum is molten in a medium-frequency induction furnace, 4.9 parts of potassium fluoroaluminate is added to the medium-frequency induction furnace after melting the aluminum, mixed and stirred evenly; 10 parts of titanium and 0.1 parts of scrap iron are added to the mixture successively, mixed and stirred evenly; the mixture is totally molten at 800° C. to 1200° C., made rest for 6 hours, then scum on the surface is removed; the obtained mixture is cast into a mould to obtain a final sealing ring.

Comparison of the sealing ring performance of the present invention with the sealing ring performance of the prior art:

|  | Embodiment 1 | Embodiment 2 | Embodiment 3 |
|---|---|---|---|
| Raw material (part) |  |  |  |
| Aluminum | 80 | 82 | 85 |
| Titanium | 15 | 13 | 10 |
| Iron | 1 | 0.5 | 0.1 |
| KAlF$_4$ | 4 | 4.5 | 4.9 |
| Performance |  |  |  |
| Softening point | 1100° C. | 900° C. | 850° C. |
| Melting point | 1300° C. | 1100° C. | 1000° C. |

It can be seen from the embodiments that sealing rings of different melting points and softening temperature can be manufactured according to different content of each raw material.

The sealing ring made in Embodiment 3 is applied to reaction equipment for producing sponge titanium. The equipment includes a reactor and a reactor cover with a stirring device, the sealing ring is arranged between the reactor cover and the reactor, one side of the reactor cover is provided with a lifting device for controlling the lifting of the reactor cover, a resistance furnace is arranged above the reactor cover, a valve is arranged below the resistance furnace, and a vacuum-pumping pipe and an inflation pipe are arranged above the reactor cover.

Embodiment 4

Chemical equations involved:

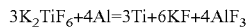

$$3K_2TiF_6+4Al=3Ti+6KF+4AlF_3$$

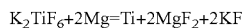

$$K_2TiF_6+2Mg=Ti+2MgF_2+2KF$$

The method includes the following steps:

Step A: placing 36 g of aluminum and 36 g of magnesium into the resistance furnace, vacuum pumping, introducing argon, heating to generate a mixed liquid;

Step B: opening the reactor cover, adding a calculated amount of potassium fluoroaluminate to the reactor, leakage detecting after closing the reactor cover, slowly raising the temperature to 150° C., vacuum pumping, and then heating to 250° C.;

Step C: introducing argon into the reactor, continuously raising the temperature to 750° C.;

Step D: opening a valve to adjust the speed, adding mixed liquid drops, and controlling the reaction temperature to 750° C. to 850° C.;

Step E: opening the reactor cover, removing the stirring device, eliminating the upper layers of KAlF$_4$, KF and MgF$_2$ to obtain 45.12 g of sponge titanium in which the content of titanium is 96.5% and the reduction rate is 90.7%.

The sealing ring of the present invention is used for the reaction to further improve the truth degree during sponge titanium production and to improve the yield.

The sealing ring of the present invention is applied to distillation equipment for producing sponge titanium. The equipment includes a heating furnace and a reactor for containing condensates, a heating furnace cover is arranged above the heating furnace, a reactor cover is arranged above the reactor, the heating furnace cover and the reactor cover are connected with each other by a pipe, a resistance wire is arranged on the pipe, a lifting device is arranged above each of the heating furnace cover and the reactor cover, a vacuum pumping pipe is arranged above the heating furnace cover, a first metal sealing ring and a second metal sealing ring are respectively arranged between both ends of the pipe and the heating furnace cover and the reactor cover.

The first metal sealing ring adopts the metal sealing ring in Embodiment 1, and the first metal sealing ring adopts the metal sealing ring in Embodiment 2.

Embodiment 5

36 g of aluminum, 18 g of magnesium and 240 g of potassium fluoroaluminate are reacted at 800° C. under the condition of vacuum introduction of argon;

in a vacuum state, the reactant is distilled in the heating furnace at 1100° C., the resulting KF, AlF$_3$, MgF$_2$ and Mg are introduced into the reactor through the pipe;

45.45 g of sponge titanium is obtained by keeping the vacuum state after cooling, the content of titanium in the product is 98% and the reduction rate is 92.8%.

The above metal sealing ring is adopted to further ensure the tightness during distillation, improve the distillation efficiency, and greatly increase the purity and reduction rate of produced sponge titanium.

The above is the further detailed description made to the invention in conjunction with specific preferred embodiments, but it should not be considered that the specific embodiments of the invention are only limited to these descriptions. For one of ordinary skill in the art to which the invention belongs, many simple deductions and replacements can be made without departing from the inventive concept. Such deductions and replacements should fall within the scope of protection of the invention.

What is claimed is:

1. A method for preparing a sealing ring, the sealing ring comprising the following components based on percent by weight:
   80%-85% of aluminum;
   10%-15% of titanium;
   0.1%-1% of scrap iron; and
   4%-4.9% of potassium fluoroaluminate:
characterized in that the method comprises the following steps of:
   step A: melting the aluminum in a medium-frequency induction furnace, adding the potassium fluoroaluminate to the medium-frequency induction furnace to form a mixture, and melting and stirring the mixture evenly;

step B: adding titanium scrap or sponge titanium, and scrap iron to the mixture successively, melting and mixing a resulting mixture totally at 800° C. to 1200° C., standing the resulting mixture after stirring evenly;

step C: removing scum on a surface of the resulting mixture; and step D: casting into a mould to obtain a final sealing ring.

2. The method according to claim 1, wherein the melting in step A is performed for 4 to 6 hours.

3. The method according to claim 2, wherein the mould in step D is made from high alumina cement or copper material.

\* \* \* \* \*